United States Patent [19]

Coutureau et al.

[11] Patent Number: 5,773,758
[45] Date of Patent: Jun. 30, 1998

[54] DEVICE FOR FITTING AND GRIPPING OF A FLEXIBLE CABLE IN A CYLINDRICAL ORIFICE AND HIGH-VOLTAGE TRANSFORMER EUIPPED WITH THIS DEVICE

[75] Inventors: Thierry Coutureau, Dole; Marguerite Tharradin, Velesmes, both of France

[73] Assignee: Thomson multimedia S.A., Courbevoie, France

[21] Appl. No.: 666,487

[22] PCT Filed: Oct. 27, 1995

[86] PCT No.: PCT/FR95/01428

§ 371 Date: Nov. 12, 1996

§ 102(e) Date: Nov. 12, 1996

[87] PCT Pub. No.: WO96/14646

PCT Pub. Date: May 17, 1996

[30] Foreign Application Priority Data

Nov. 7, 1994 [FR] France .................................. 94 13331

[51] Int. Cl.[6] ...................................................... H02G 3/18
[52] U.S. Cl. ...................... 174/65 R; 439/460; 285/162; 285/322
[58] Field of Search ............................. 174/65 R, 65 SS, 174/65 G, 50, 152 G, 153 G, 151; 248/56; 439/449, 460, 461, 462; 16/2.1, 2.2; 285/33, 34, 35, 162, 81, 92, 323, 322

[56] References Cited

U.S. PATENT DOCUMENTS

| 1,797,194 | 3/1931 | Knapp ..................................... 403/370 |
|---|---|---|
| 2,530,258 | 11/1950 | Marsan ................................. 439/449 X |
| 3,801,727 | 4/1974 | Wilkinson et al. ........................ 174/50 |
| 4,005,883 | 2/1977 | Guest ....................................... 285/322 |
| 4,386,817 | 6/1983 | Benker et al. ..................... 174/65 G X |
| 4,408,176 | 10/1983 | Nakamura ............................... 336/107 |
| 4,789,759 | 12/1988 | Jones ................................... 174/65 SS |
| 5,276,280 | 1/1994 | Ball ....................................... 174/65 R |
| 5,564,757 | 10/1996 | Seabra .................................... 285/322 |

FOREIGN PATENT DOCUMENTS 0461713  12/1991  European Pat. Off. .

Primary Examiner—Kristine L. Kincaid
Assistant Examiner—Dean A. Reichard
Attorney, Agent, or Firm—Joseph S. Tripoli; Frederick A. Wein

[57] ABSTRACT

The disclosure is a device for mechanical assembly of a flexible cable in a cylindrical orifice, including a cable grip member slotted axially and carrying at least two helical threads on the outside and protuberances on the inside. The cylindrical orifice has a thread that engages the threads of the cable grip member. To fit the cable, the cable grip member is pushed axially into the cylindrical orifice, then the flexible cable is inserted axially in the cable grip member. Removal of the cable is achieved by unscrewing the cable grip member from the cylindrical orifice. The protuberances and the compression effect produced by the helical threads pulling on the thread in the cylindrical orifice when axial tension is applied to the cable assure efficient gripping of the cable.

8 Claims, 2 Drawing Sheets

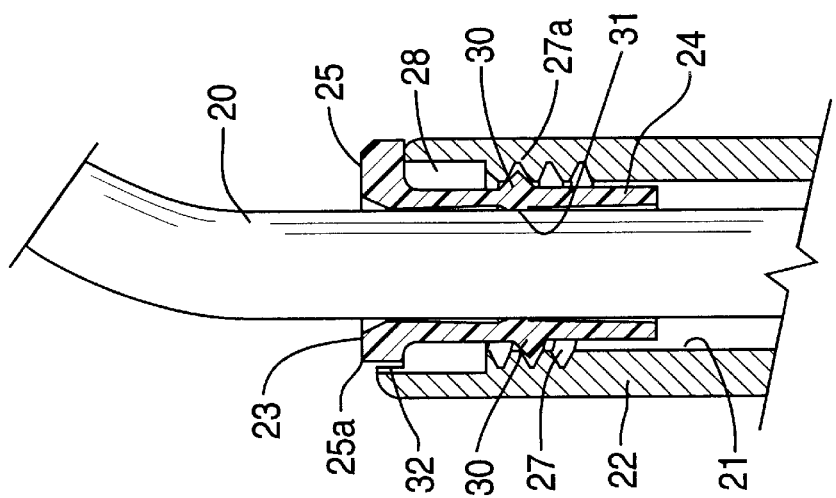
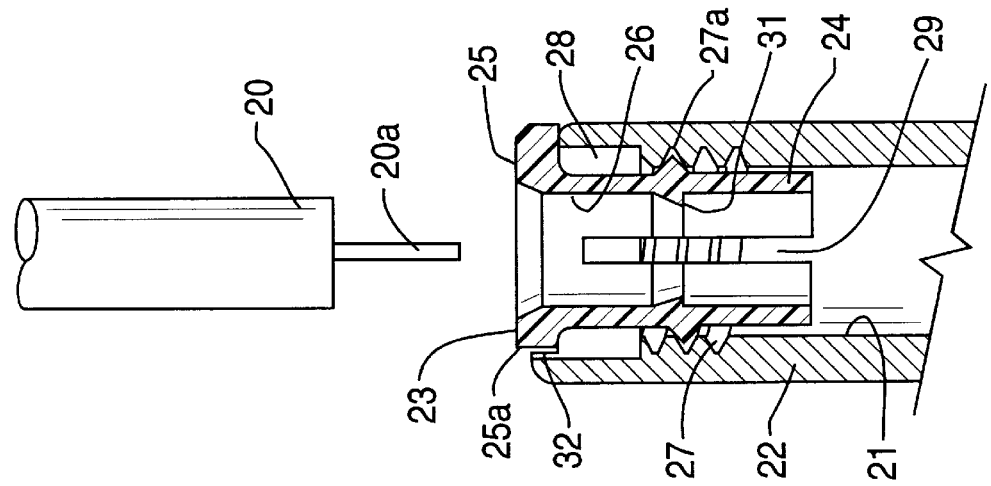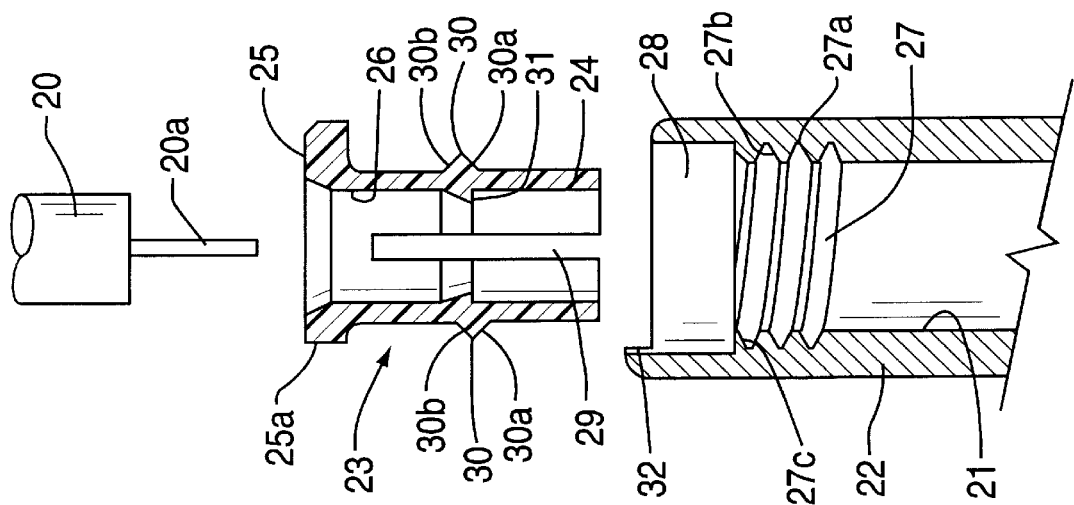

DEVICE FOR FITTING AND GRIPPING OF A FLEXIBLE CABLE IN A CYLINDRICAL ORIFICE AND HIGH-VOLTAGE TRANSFORMER EUIPPED WITH THIS DEVICE

FIELD OF THE INVENTION

The invention concerns a device for assembly of a flexible cable in a cylindrical orifice enabling the cable to be gripped in the orifice so that it resists axial pulling forces. Among the applications of such a device, one particularly important one is in a high-voltage (HV) transformer in which the device can be used to secure HV cables to the transformer outputs.

BACKGROUND OF THE INVENTION

There exist many devices for attaching cables so that they are gripped and can resist accidental pulling forces. In the field of HV transformers, in particular those intended for use with cathode ray tubes (CRT), the HV outputs of the transformer (that provide the power supply, focusing voltage, etc.) are connected to other components via HV electrical cables. In the case of an HV transformer used with the CRT of a television, for example, the output voltage required to power the CRT is typically 25 to 30 KV, whereas the focusing voltage is 10 to 12 KV. To assure safety in use, the transformer must have projecting tubular parts, known as "chimneys", that prolong the insulating casing of the transformer and in which the HV output cables are inserted. To assure the electrical connection of the HV cables to the corresponding outputs of the HV transformer, cable assembly devices are included at the open ends of the chimneys.

An HV transformer in which the chimneys are associated with clipping devices intended to prevent pulling out of the cables is described in the European patent No. 0236 642. The clamping device has a small tapered collar that engages a pin within each chimney. Above the clamping collar, the device includes a rigid tubular extension that protrudes from the end of the chimney.

Another commonly-used solution, which will be described below with reference to FIG. 1, consists of a cable grip that is split axially and that has two lateral external protuberances half way along of the split section that engage holes n the chimneys. This solution requires the chimneys to be made longer in order o allow space for the cable grip.

Both the conventional techniques mentioned above have the disadvantage of increasing the overall size of the HV transformer, since the chimneys must be made longer than the strict minimum required for electrical safety reasons. In view of the increasing need for miniaturization of components, this is therein serious drawback. Furthermore, these techniques make the deliberate removal of the cable difficult, since axial extraction from the chimney of the HV transformer requires a large radial deformation of the cable.

SUMMARY OF THE INVENTION

The object of the present invention is a device for mechanical assembly of a flexible cable in a cylindrical orifice, including a cable grip member to hold the cable in the cylindrical orifice and prevent its being pulled out axially, wherein said cable grip member engages a thread in said cylindrical orifice, enabling the cable grip member to be clicked axially into the cylindrical orifice before the insertion of the flexible cable, but enabling the axial extraction of the flexible cable only by unscrewing the cable grip member from the orifice.

The cable assembly technique according to the invention can be used for all types of cable, electrical cable for example. It minimizes the additional space required by the assembly system, while enabling easy insertion of the cable in the cylindrical orifice, assuring excellent resistance of the cable to axial pulling forces, and enabling easy removal of the cable.

Another object of the invention is a compact HV transformer for which the fitting and removal of the cables in the chimneys is easy and rapid.

The device according to the invention provides for mechanical assembly of a flexible cable in a cylindrical orifice by means of a cable grip member that enables the cable in the cylindrical orifice to resist axial pulling forces. According to the invention, the cable grip member works in association with a threaded section in the cylindrical orifice that enables the cable grip member to be clicked directly into the orifice before insertion of the flexible cable. Once the cable is inserted, it can e removed from the orifice only by unscrewing the cable grip member. The cable rip member is preferably made of rigid plastic material and includes a head to facilitate its manipulation during fitting in or removal from the cylindrical orifice, and a tubular part with two diametrically opposite axial slots running from the free end of the tubular part to near the head.

According to the invention, the tubular part of the cable grip member includes at least two helical male threads whose major diameter is slightly larger than the diameter of the cylindrical orifice, so that the axial insertion of the cable grip member without the cable requires an elastic radial deformation of the tubular part of the cable grip member, this deformation being made possible by axial slots in this part and by the slope of the male threads on the tubular part and of the female thread in the cylindrical orifice, and so that the removal of the cable grip member gripping the cable requires the unscrewing of the helical threads from the threads in the cylindrical orifice.

The cable grip member includes protuberances whose inner diameter is smaller than the cable diameter. However, once the cable grip member is in place in the cylindrical orifice the radial elasticity of the tubular part and the radial clearance between the helical threads and the bottom of the female thread in the cylindrical orifice enable the cable to be inserted in the tubular part. Withdrawal of the cable is prevented, first, by the gripping of the protuberances on the exterior of the cable and, secondly, by the slope of the threads on the tubular part and in the cylindrical orifice which tend to compress the tubular part radially onto the cable when it is pulled axially.

The protuberances are preferably in the form of annular ridges inside the tubular part and separated into two parts on each side of the axial slots of the tubular part. The protuberances advantageously have a right-angled triangular section of which one side is inclined, facilitating the centering of the cable when it is inserted in the tubular part of the cable grip member.

The helical threads and the protuberances of the tubular part of the cable grip member are preferably located at the same level, approximately half way along the tubular part of the cable grip member, in order to take advantage of the flexibility provided by the axial slots in the tubular part.

The removal of the cable grip member is not possible by pulling axially, so it must be removed by unscrewing, the threads on the tubular part running in the threads in the cylindrical orifice. A recess can be made in the open end of the cylindrical orifice. This recess is circular and must have a diameter greater than or equal to the major diameter of the helical threads of the tubular-part of the cable grip member in order to enable unscrewing of the helical threads of the tubular part of the cable grip member. The depth of the recess must be such that one or two unscrewing rotations of the cable grip member are sufficient to liberate the threads on the cable grip member from those in the cylindrical orifice. When the helical threads are located about half way along the tubular part of the cable grip member, the depth of the recess can be about one third of the length of the tubular part of the cable grip member.

In order to avoid accidental unscrewing of the cable grip member from the cylindrical orifice, it is possible to include a stop that protrudes axially at the open end of the cylindrical orifice. This stop locks the head of the cable grip member and prevents any angular movement This stop preferably offers a degree of radial flexibility in order to allow the head of the cable grip member to be deliberately turned when it is necessary to unscrew the cable grip member from the cylindrical orifice.

The device according to the invention can be used for the assembly of all types of flexible cables in a cylindrical orifice. In the context of electrical cables, a particularly useful application of the invention is the connection of HV cables to the outputs of an HV transformer. As we have mentioned previously, the invention enables the height of the chimney of the HV transformer to be reduced, making the transformer smaller, while providing for easy fitting and removal of HV cables.

BRIEF DESCRIPTION OF THE DRAWINGS

The invention will be better understood on reading the following detailed description of a preferred, though non-limitative embodiment, making reference to the appended figures, of which:

FIGS. 2a, 2b and 2c show three stages of assembly of a flexible cable in the cable assembly device according to the invention and that can be used in a high-voltage transformer such as the one shown in FIG. 1.

FIG. 1 shows an WV transformer including a magnetic circuit 1, a coil 2 that is enclosed in a casing 3 of rigid, electrically insulating plastic material, electrical connectors 4 in the form of pins connected to the primary winding (not shown) and possibly to the secondary winding of the coil 2.

Figure 1:
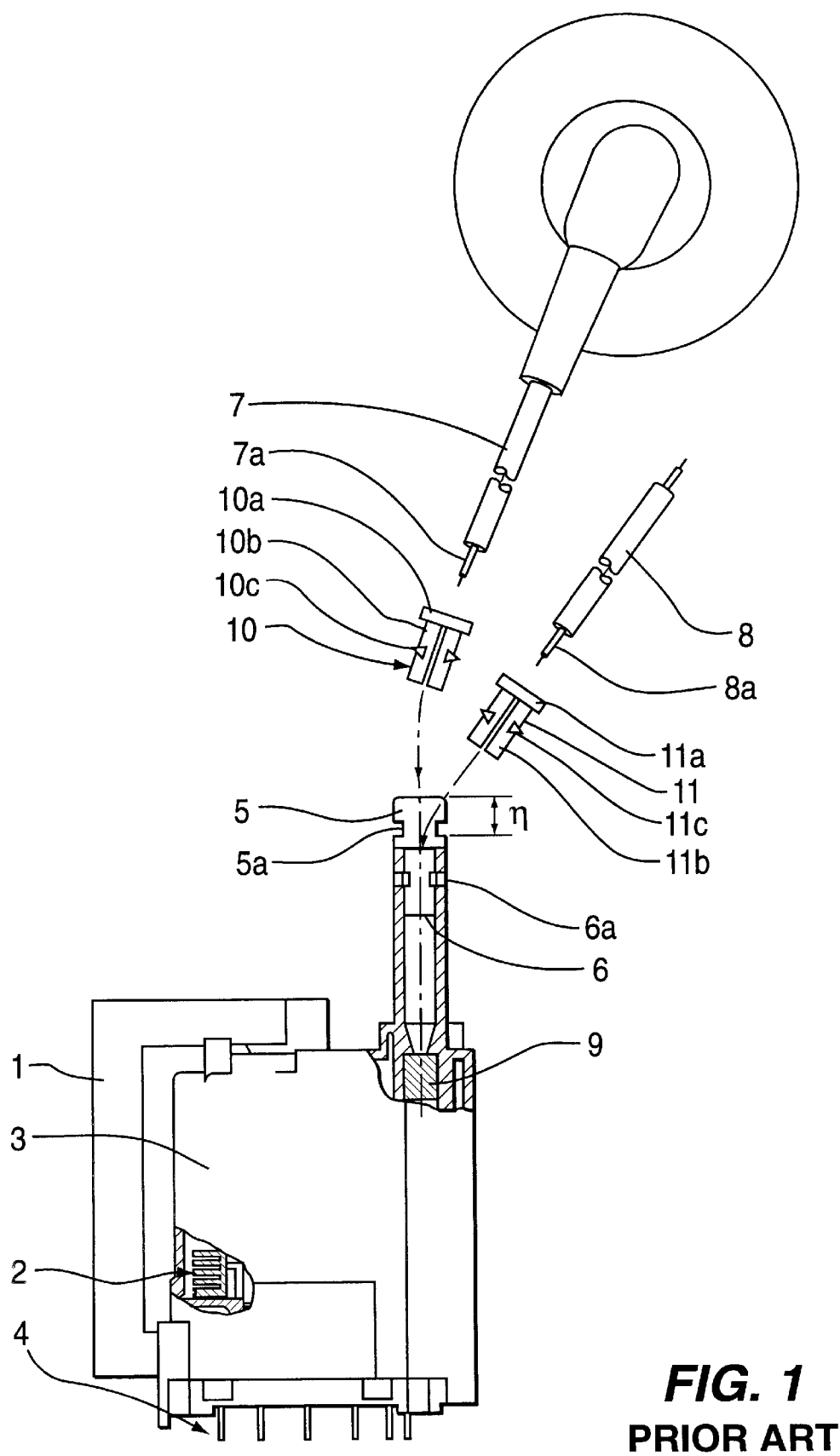
FIG. 1 shows a high-voltage transformer fitted with a prior art cable assembly d e

In view of the high voltages generated at the outputs of the transformer, tubular extensions of the insulating casing 3 are necessary in order to separate these outputs from other components nearby, to avoid any risk of short circuits to grounded parts and any electrical interference between the transformer and neighboring electrical components.

The HV transformer shown in FIG. 1 is intended to supply power to a CRT. It has two HV outputs, the first powering the anode of the CRT (not shown) which emits and accelerates an electron beam, and the second used for focusing this beam. The tubular extensions of the insulating casing 3 that delimit the HV outputs from the transformer are known as chimneys. In FIG. 1, the chimneys 5 and 6 provide respectively the HV voltages for the CRT anode power supply and the focusing. In order to assure electric insulation, the length of the chimneys 5 and 6 can range from 20 to 40 mm depending on the output voltage of the transformer. The electrical connection between the WV cables 7 and 8 and the HV outputs of the transformer is assured by a pellet 9 of silicone containing conducting powder and located at the bottom of each chimney 5 and 6. The technique of the electrical connection will not be described in detail here (the interested reader may consult the European patent No. 236 642).

The electrical connection between the HV cables 7, 8 and the conducting pellets 9 is made by pushing the stripped ends 7a, 8a of these cables into the pellets 9. Cable grip members 10 and 11 are used to hold the cables 7, 8 in the chimneys 5, 6 such that the cables can resist axial pulling forces and thereby guarantee a reliable electrical connection between the cables 7, 8 and the pellets 9. Each cable grip member includes a circular head 10a, 11a attached to a tubular part 10b, 11b split axially. The tubular parts 10b, 11b of the cable grip members include radial protuberances 10c, 11 c on their outer surfaces. These protuberances 10c, 11c engage holes 5a, 6a in the sides of the chimneys 5, 6.

To fit the HV cables 7, 8, first the cable grip members 10, 11. are pushed into the corresponding chimneys 5, 6 in the direction indicated by the arrow in FIG. 1.

The lateral protuberances 10c, 11c engage the holes 5a, 6a in the sides of the chimneys 5, 6. Next, the HV cables 7, 8 are pushed through the cable grip members 10, 11 already in place until their stripped ends 7a, 8a penetrate the corresponding conducting pellets 9. Protuberances (not shown) on the inner surface of the tubular parts 10b, 11b of the cable grip members 10, 11 prevent the cables 7, 8 from being pulled out of the chimneys 5, 6.

The solution described above involving the use of cable grip member members 10, 11 is effective as regards the gripping of the HV cables in the chimneys. However, the gripping technique depends on the engagement of the lateral protuberances 10c, 11c within the holes 5a, 6a in the chimneys. Moreover, the gripping mechanism requires a supplementary height h above the chimneys, which is of the order of 6 mm for a chimney 30 mm high, representing a 20% increase in height over that which is strictly necessary for reasons of electrical insulation.

Moreover, to remove the HV cables from the chimneys, considerable radial force must be applied to the cable grip members 10, 11 via the holes 5a, 6a in the chimneys 5, 6, otherwise it is impossible to withdraw the cables 7, 8. On the other hand, if the radial force is excessive, the rubber sheathing of the cable may be damaged by the internal protuberances of the cable grip members 10, 11 and thereby diminish the electrical insulation of the HV cables 7, 8.

The present invention overcomes these problems. In the non-limitative example of its application to the HV transformer in FIG. 1, a simple and reliable cable grip member device is used that avoids the increase h in the overall height of the chimneys associated with prior art solutions.

As shown in FIGS. 2a and 2b, the device according to the invention can be used to assemble a flexible cable 20, which is for example an HV electrical cable with a stripped end 20a used to make the electrical connection as in the case of the cable 7, 8 described previously. The flexible cable 20 must be inserted and gripped in a cylindrical orifice 21 which is for example the inner surface of a high-voltage chimney 22 of the type 5, 6 described previously. A cable grip member 23 comprises a tubular part 24, and a head 25 in the form of a collar with a flat side face 25a. The cable grip member 23 has an inner cylindrical orifice 26 that can receive axially the flexible cable 20.

The cylindrical orifice 21 has a female thread 27 over part of its length and a cylindrical recess 28 whose base is in contact with the thread 27. The diameter of the recess 28 is greater than or equal to the major diameter of the helical threads of the tubular part 24 of the cable grip member 23.

The tubular part 24 of the cable grip member 23 has two diametrically opposite axial slots 29 running from the free end of the tubular part 24 to near the head 25. The tubular part 24 is therefore divided into two parts that offer a degree of radial flexibility. The outer surface of the tubular part 24 carries two male helical threads 30 intended to engage the thread 27 in the cylindrical orifice 21.

On the inner surface of the cylindrical orifice 26 of the tubular part 24 there is an annular protuberance 31 divided into 2 by the axial slots 29 and having a right-angle triangular section inclined to facilitate the centering of the cable 20 when it is inserted in the cylindrical orifice 26. The end of the chimney 22 has an angular stop 32 protruding axially to engage the side face 25a on the head 25 of the cable grip member 23.

The assembly and removal operations of the device according to the invention are very simple. First, the cable grip member 23 is inserted in the cylindrical orifice 21 of the chimney 22 making sure that the side face 25a on the head is aligned with the stop 32. The major diameter of the threads 30 is slightly larger than the diameter of the cylindrical orifice 21, so the cable grip member 23 can be pushed into the cylindrical orifice clip-fashion without rotation. The slopes of the lower surfaces 30a of the threads 30 and of the upper surface 27a of the thread 27 help to center the tubular part 24 and to force the two sides of the tubular part 24 to move towards each other radially, which is made possible by the flexibility provided by the axial slots 29. The axial movement of the insertion of the cable grip member 23 is stopped when the head 25 meets the upper end of the chimney 22 (FIG. 2b). In this position, the threads 30 of the cable grip member 23 are engaged in the thread 27 and are no longer subjected to radial compression.

Once the cable grip member 23 is in place in the cylindrical orifice 21, the flexible cable 20 is inserted axially in the cylindrical orifice 26 of the cable grip member 23. The cable diameter is less than the internal diameter of the orifice 26 but greater than the inner diameter of the annular protuberance 31. The major diameter of the male threads 30 is less than the diameter 27a of the bottom of the female thread 27. Consequently, the insertion of the cable 20 causes the two sides of the slotted tubular part 24 of the cable grip member 23 to be forced outwards (which is made possible by the flexibility provided by the axial slots 29 in the tubular part 24), after which these sides of the tubular part 24 tend to exert pressure on the cable.

Therefore we see that insertion of the cable 20 is facilitated, whereas its removal by pulling axially is prevented by the fact that the annular protuberance 31 has a sharp ridge oriented downwards that deforms the flexible cable 20 radially. Not only does axial tension on the cable tend to increase the gripping of this ridge of the annular protuberance 31 on the cable, but also, when the upper surfaces 30b of the threads 30 come into contact with the lower surface 27c of the thread 27 (FIG. 2a), the slopes of these surfaces 30b and 27c tend to force the sides of the tubular part 24 radially towards each other, forcing the ridges of the annular protuberance 31 into the cable 20. The result is very efficient gripping of the cable 20 in the cylindrical orifice 21, which prevents the cable 20 from being accidentally or deliberately pulled out of this orifice.

The stop 32 engages the side face 25a of the head 25 to prevent unscrewing of the cable grip member 23. This assures the reliability of the securing of the cable 20 in the cylindrical orifice 21.

To enable the cable 20 to be removed from the cylindrical orifice 21, the stop 32 has a degree of radial flexibility, so that deliberate unscrewing of the cable grip member 23 remains possible. The presence of the recess 28 enables the number of turns necessary for unscrewing the cable grip member 23 to be minimized, and it also minimizes the number of threads 30 that have to be forced across the threads 27 during clipping of the cable grip member 23 into the cylindrical orifice 21.

In this application of the invention to a high-voltage transformer, the invention avoids the increase in height of the chimneys associated with prior art cable grip members 10, 11. The height of the chimneys is the minimum necessary to assure electrical safety, and the transformer is therefore more compact.

What is claimed is:

1. Device for the mechanical assembly of a flexible cable in a cylindrical orifice-comprising:

a cable grip member to hold the cable in the cylindrical orifice and prevent its being pulled out axially, said cable grip member having a first helical thread for engaging a second helical thread in said cylindrical orifice. enabling the cable grip member to be clicked axially into the cylindrical orifice before insertion of the flexible cable, but enabling axial extraction of the flexible cable only by unscrewing the cable grip member from the orifice, wherein said cable grip member comprises a head and a tubular part with two diametrically opposite axial slots running from a free end of the tubular part to near the head, this tubular part carrying said first helical thread whose diameter is slightly larger than the diameter of the cylindrical orifice, such that insertion of said cable grip member without said flexible cable into said cylindrical orifice requires an elastic radial deformation of the tubular part, this deformation being made possible by the presence of the axial slots and being facilitated by respective slopes of said first helical thread on the tubular part and of said second helical thread in said cylindrical orifice, and wherein extraction of said cable grip member once said flexible cable is inserted therein requires unscrewing said cable grip member from said cylindrical orifice.

2. Mechanical assembly device according to claim 1, wherein said cable grip member includes inwardly projecting protuberances which defines an inner diameter which is less than a diameter of said flexible cable, such that once said cable grip member is in place in said cylindrical orifice, radial elasticity of said tubular part and radial clearance between said helical threads and a bottom of said, second thread in said cylindrical orifice enable said cable to be inserted in said tubular part, withdrawal of the cable being prevented by a gripping force of the protuberances on an exterior of the cable and by the respective slopes of said first helical thread on said tubular part of said cable grip member and of said second thread in said cylindrical orifice which tends to compress said tubular part of said cable grip member radially and inwardly onto the cable when it is pulled axially.

3. Mechanical assembly device according to claim 2, wherein said protuberances are in the form of an annular ridge inside said tubular part this annular ridge being separated into two parts, one on each side of said axial slots and having a right-angle triangular section inclined to facilitate the centering of said flexible cable during its insertion into said tubular part.

4. Mechanical assembly device according to claim 2, wherein wherein said first helical threads and said protuberances are located approximately half way along said tubular part of said cable grip member, and wherein said cylindrical orifice has a cylindrical recess at the end where said flexible cable is inserted whose diameter is greater than or equal to the outer diameter of said first helical thread and whose depth is about one third of a length of said tubular part of said cable grip member.

5. Mechanical assembly device according to claim 1, wherein said cylindrical orifice includes at an end where said flexible cable is inserted an axially and outwardly projecting stop that engages said head of said cable grip member thus preventing accidental unscrewing of the cable grip member.

6. Mechanical assembly device according to claim 5, wherein said projecting stop has a degree of radial flexibility enabling said head of said cable grip member to be pushed deliberately in order to unscrew it.

7. Mechanical assembly device according to claim 6, wherein said head of said cable grip member is in the form of a collar with a side face engagable by said stop.

8. A high-voltage transformer including an insulating casing fitted with a high-voltage output orifice which is equipped with a device for the mechanical assembly of a flexible cable inserted into the orifice, comprising:

a cable grip member to hold the cable in the cylindrical orifice and prevent its being pulled out axially, said cable grip member having a first helical thread for engaging a second helical thread in said cylindrical orifice, enabling the cable grip member to be clicked axially into the cylindrical orifice before insertion of the flexible cable, but enabling axial extraction of the flexible cable only by unscrewing the cable grip member from the orifice, wherein said cable grip member comprises a head part and a tubular part with two diametrically opposite axial slots running from a free end of the tubular part to near the-head, this tubular part carrying said first thread whose diameter is slightly larger than the diameter of the cylindrical orifice, such that insertion of said cable grip member without said flexible cable into said cylindrical orifice requires an elastic radial deformation of the tubular part, this deformation being made possible by the presence of the axial slots and being facilitated by respective slopes of said first helical thread on the tubular part and of said second thread in said cylindrical orifice, and wherein extraction of said cable grip member once said, flexible cable is inserted therein requires unscrewing said cable grip member from said orifice.

* * * * *